United States Patent
Sankaran et al.

(10) Patent No.: US 7,234,075 B2
(45) Date of Patent: Jun. 19, 2007

(54) DISTRIBUTED FAILOVER AWARE STORAGE AREA NETWORK BACKUP OF APPLICATION DATA IN AN ACTIVE-N HIGH AVAILABILITY CLUSTER

(75) Inventors: Ananda Chinnaiah Sankaran, Austin, TX (US); Nam V. Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 563 days.

(21) Appl. No.: 10/748,634

(22) Filed: Dec. 30, 2003

(65) Prior Publication Data

US 2005/0149684 A1    Jul. 7, 2005

(51) Int. Cl.
*G06F 11/00*    (2006.01)
(52) U.S. Cl. .......................................... 714/13; 714/15
(58) Field of Classification Search .................. 714/13
See application file for complete search history.

(56) References Cited

U.S. PATENT DOCUMENTS

| | | | |
|---|---|---|---|
| 5,388,267 A | 2/1995 | Chan et al. ................... 395/700 |
| 5,757,642 A | 5/1998 | Jones ......................... 364/134 |
| 5,923,833 A * | 7/1999 | Freund et al. ................ 714/19 |
| 6,058,490 A * | 5/2000 | Allen et al. .................... 714/9 |
| 6,078,979 A | 6/2000 | Li et al. ...................... 710/129 |
| 6,279,093 B1 | 8/2001 | Beelitz ........................ 711/173 |
| 6,279,155 B1 | 8/2001 | Amberg et al. ................ 717/11 |
| 6,279,156 B1 | 8/2001 | Amberg et al. ................ 717/11 |
| 6,327,706 B1 | 12/2001 | Amberg et al. ................ 717/11 |
| 6,347,371 B1 | 2/2002 | Beelitz et al. ................. 713/2 |
| 6,360,331 B2 * | 3/2002 | Vert et al. ...................... 714/4 |
| 6,363,497 B1 * | 3/2002 | Chrabaszcz .................. 714/13 |
| 6,393,539 B1 | 5/2002 | Nguyen et al. ............. 711/164 |
| 6,412,068 B1 | 6/2002 | Nolan et al. .................... 713/1 |
| 6,470,434 B1 | 10/2002 | Beelitz ........................ 711/173 |
| 6,473,857 B1 | 10/2002 | Panas et al. .................... 713/2 |
| 6,584,560 B1 | 6/2003 | Kroun et al. ................... 713/2 |
| 6,609,213 B1 | 8/2003 | Nguyen et al. ................. 714/4 |
| 6,615,406 B1 | 9/2003 | Amberg et al. ............. 717/177 |
| 6,622,163 B1 | 9/2003 | Tawill et al. ................ 709/211 |
| 6,785,786 B1 * | 8/2004 | Gold et al. .................. 711/162 |
| 7,035,880 B1 * | 4/2006 | Crescenti et al. ........... 707/204 |
| 7,069,267 B2 * | 6/2006 | Spencer, Jr. .................. 707/10 |
| 7,085,962 B1 * | 8/2006 | Hamilton et al. ............. 714/15 |
| 2002/0144069 A1 * | 10/2002 | Arakawa et al. ............ 711/162 |
| 2002/0190868 A1 | 12/2002 | Dearborn et al. ........ 340/691.1 |
| 2003/0018756 A1 | 1/2003 | Nguyen et al. ............. 709/220 |

(Continued)

*Primary Examiner*—Gabriel L. Chu
(74) *Attorney, Agent, or Firm*—Baker Botts L.L.P.

(57) ABSTRACT

A SAN-based cluster backup system and method are provided. The system and method are automated, do not use a LAN for backup data, and are made aware of application failover events. The system and method are composed of two main components: a backup service, and a primary coordinator. The backup service performs the backup of the applications that are hosted on a particular node. The backup service periodically checkpoints the state of the backup job and communicates the status to the primary coordinator. The primary coordinator controls all backup operations in the cluster. The user submits backup jobs for the applications through the primary coordinator. If a node fails during a backup operation, the primary coordinator can ensure that the failed backup job can be resumed from the last checkpoint on the failed-over node. In this way, repetitive backups can be avoided, thereby increasing efficiency.

25 Claims, 4 Drawing Sheets

U.S. PATENT DOCUMENTS

2003/0055932 A1 3/2003 Brisse .................. 709/223
2003/0061382 A1 3/2003 Brown et al. ............ 709/245
2003/0177150 A1* 9/2003 Fung et al. ............. 707/204
2003/0182326 A1* 9/2003 Patterson .............. 707/204
2004/0049573 A1* 3/2004 Olmstead et al. ........ 709/224

* cited by examiner

DISTRIBUTED FAILOVER AWARE STORAGE AREA NETWORK BACKUP OF APPLICATION DATA IN AN ACTIVE-N HIGH AVAILABILITY CLUSTER

BACKGROUND

1. Field of the Disclosure

The present disclosure relates in general to the field of data storage systems and, more particularly, to a system and method for backing up storage resources in a clustered computing environment.

2. Background of the Related Art

As the value and the use of information continue to increase, individuals and businesses seek additional ways to process and store information. One option available to users is information handling systems. An information handling system generally processes, compiles, stores and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, redundant array of independent disks ("RAID") system and telecommunications switch.

Storage area networks ("SANs") often include a collection of data storage resources communicatively coupled to a plurality of nodes such as workstations and servers. In the present disclosure, the term "node" and "server" are used interchangeably, with the understanding that a "server" is one type of "node".

Clustering involves the configuring of a group of independent servers so that they appear on a network as a single machine. Often, clusters are managed as a single system, share a common namespace, and are designed specifically to tolerate component failures and to support the addition or subtraction of components in a transparent manner.

With the advent of multi-node clusters, cluster configurations with several active nodes are possible. An active node in a high-available ("HA") cluster hosts some application, while a passive node waits for an active node to fail so that the passive node can host the failed node's application. Cluster applications have their data on shared SAN attached disks that are accessible by all of the nodes. In a cluster environment using the Share-Nothing model, at any point in time, only the node that hosts an application can own the application's shared disks. In this scenario, where the applications remain spread across different nodes of the cluster, there arises a requirement to have a cluster backup solution that is completely SAN-based, using a shared tape library that is accessible by all of the nodes of the cluster.

Moreover, there is also a need for the solution to the problem to be failover aware because the applications may reside on different (failover or backup nodes) at different points in time during the backup cycle.

Veritas, Inc. of Mountain View, Calif., has a backup solution called BACKUP EXEC® that can backup data from one node of the cluster to a SAN-attached tape library that is shared. Data from other nodes need to be passed to this node through the LAN and thus it is not completely SAN-based. Passing data through the local area network ("LAN"), is undesirable because a major portion of the network bandwidth is used for backup instead of moving current data. Alternatively, to avoid the problem of using the LAN, a private network can be established and dedicated to backup purposes. Unfortunately, implementing a private network is expensive, both in terms of wiring, and in terms of peripheral devices (network interface cards, etc.), maintenance (including operating system maintenance), and labor. Yet another alternative is to implement BACKUP EXEC® onto all cluster nodes and to perform a local SAN backup on each node. However, the latter alternative is not fail-over aware and backup management becomes complicated to administer since applications are not statically assigned to nodes because the applications move across nodes during failure and maintenance.

SUMMARY OF THE INVENTION

In accordance with the present disclosure, a system and method are provided for a SAN-based cluster backup on an information handling system or cluster of information handling systems. The system and method are automated, do not use a LAN for backup data, and are made aware of application failover events. The system and method are composed of two main components: a backup service, and a primary coordinator. The backup service performs the backup of the applications that are hosted on a particular node. The backup service periodically checkpoints the state of the backup job and communicates the status to the primary coordinator. The primary coordinator controls all backup operations in the cluster. The user submits backup jobs for the applications through the primary coordinator. If a node fails during a backup operation, the primary coordinator can ensure that the failed backup job can be resumed from the last checkpoint on the failed-(over) node. In this way, repetitive backups can be avoided, thereby increasing efficiency.

According to one aspect of the present disclosure, a method for backing up applications hosted on nodes of a cluster is provided. In one embodiment, the backup of the application hosted on the node is accomplished completely through the SAN. In another embodiment, the backup service periodically checkpoints the state of the backup job and communicates the state to the primary coordinator. If a node fails during a backup operation, the backup job can be resumed from the last checkpoint on the failed-over node because the disk will now be owned by the new node and the checkpoints can be obtained from the primary coordinator. The backup service receives backup job parameters such as source data, destination tape drives, job schedules and the like from the primary coordinator. Moreover, the primary coordinator can also perform a checkpoint restart, or a fresh restart after a failover event.

According to another aspect of the present disclosure, a method is provided for employing a backup coordinator to control all of the backup operations in the cluster. The primary coordinator is used to maintain a backup operations database; arbitrate usage of shared storage devices for the cluster nodes; communicate with the cluster service to obtain updates on the failover details; and after a failover event, inform the backup service as to which jobs are to be performed.

In one embodiment, the system may also include a plurality of computing platforms communicatively coupled to the first node. These computing platforms may be, for example, a collection of networked personal computers. The system may also include a Fibre Channel ("FC") switch communicatively coupled to the first node and to a plurality of storage resources. The Fibre Channel switch may, in some embodiments, include a central processing unit operable to execute a resource management engine.

Other technical advantages should be apparent to one of ordinary skill in the art in view of the specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

Figure 1:
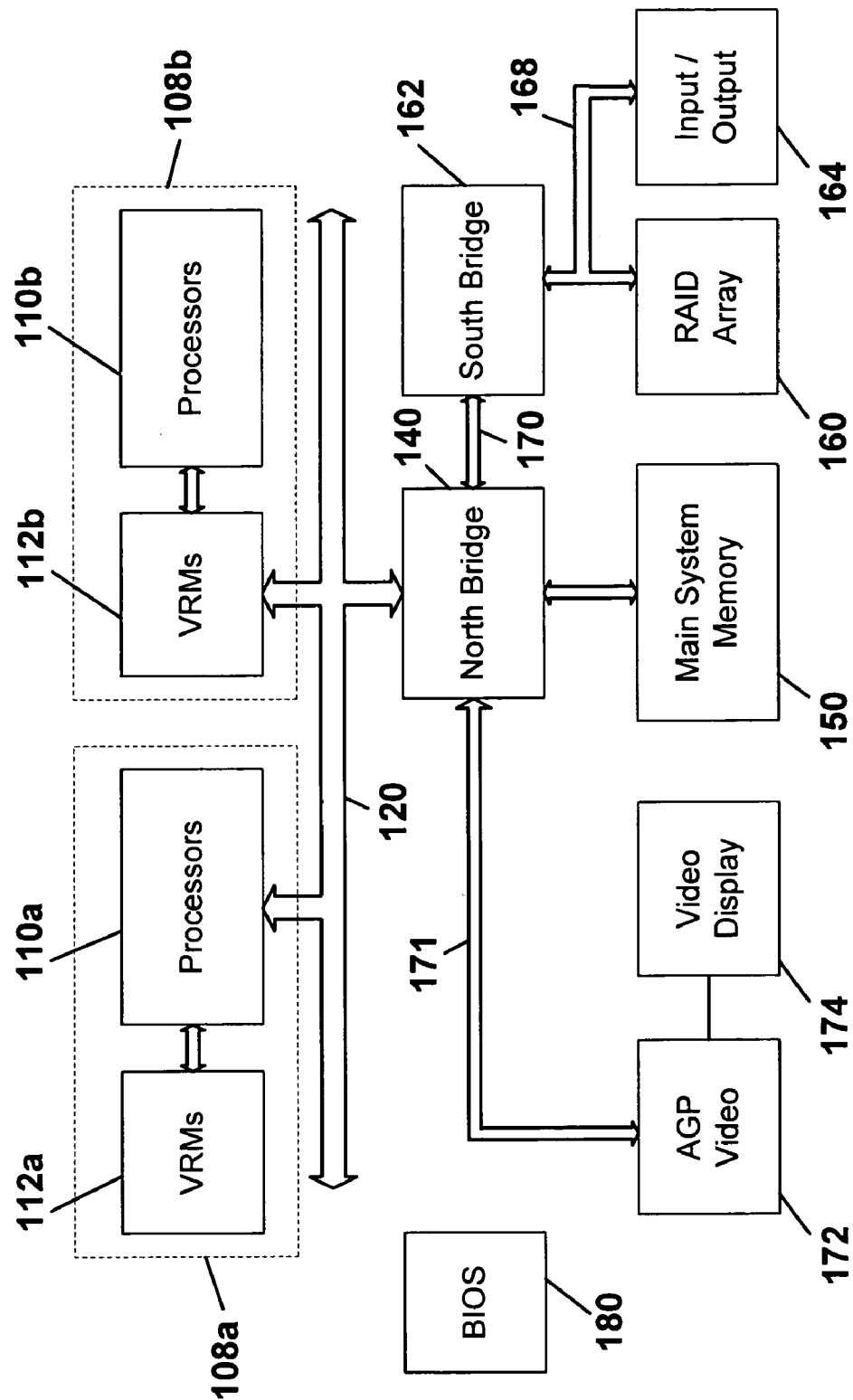
FIG. 1 depicts a component diagram of a storage area network including one embodiment of a resource management engine that incorporates the teachings of the present disclosure.

The present disclosure may be susceptible to various modifications and alternative forms. Specific exemplary embodiments thereof are shown by way of example in the drawing and are described herein in detail. It should be understood, however, that the description set forth herein of specific embodiments is not intended to limit the present disclosure to the particular forms disclosed. Rather, all modifications, alternatives, and equivalents falling within the spirit and scope of the invention as defined by the appended claims are intended to be covered.

DETAILED DESCRIPTION OF THE PREFERRED EMBODIMENTS

The present disclosure provides a complete SAN-based cluster backup solution that is automated, aware of application failover, and does not use the LAN for backup of data. The present disclosure is comprised of two main components. First, there is a backup service; second, there is the primary coordinator.

Elements of the present disclosure can be implemented on a computer system, as illustrated in FIG. 1. Referring to FIG. 1, depicted is an information handling system, generally referenced by the numeral 100, having electronic components mounted on at least one printed circuit board ("PCB") (not shown) and communicating data and control signals therebetween over signal buses. In one embodiment, the information handling system is a computer system. The information handling system comprises processors 110 and associated voltage regulator modules ("VRMs") 112 configured as processor nodes 108. There may be one or more processor nodes 108, one or more processors 110, and one or more VRMs 112, illustrated in FIG. 1 as nodes 108a and 108b, processors 110a and 110b and VRMs 112a and 112b, respectively. A north bridge 140, which may also be referred to as a "memory controller hub" or a "memory controller," is coupled to a main system memory 150. The north bridge 140 is coupled to the processors 110 via the host bus 120. The north bridge 140 is generally considered an application specific chip set that provides connectivity to various buses, and integrates other system functions such as memory interface. For example, an INTEL® 820E and/or INTEL® 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions, such as main memory control functions, typically reside in the north bridge 140. In addition, the north bridge 140 provides bus control to handle transfers between the host bus 120 and a second bus(es), e.g., PCI bus 170 and AGP bus 171, the AGP bus 171 being coupled to the AGP video 172 and/or the video display 174. The second bus may also comprise other industry standard buses or proprietary buses, e.g., ISA, SCSI, USB buses 168 through a south bridge (bus interface) 162. These secondary buses 168 may have their own interfaces and controllers, e.g., RAID Array storage system 160 and input/output interface(s) 164. Finally, a BIOS 180 is operative with the information handling system 100 as illustrated in FIG. 1. The information handling system 100 can be combined with other like systems to form larger systems. Moreover, the information handling system 100, can be combined with other elements, such as networking elements, to form even larger and more complex information handling systems.

The backup service runs on each node, performing the backup of applications that are hosted on that particular node using only the SAN (not the LAN). The backup service periodically checks the state of the backup job and communicates that state to the primary coordinator. If a node fails during a backup operation, the backup task can be resumed from the last checkpoint on the failed-over node (because the disk in question will now be owned by the new node, and the checkpoints can be obtained from the primary coordinator. The backup service receives backup job parameters, such as source data, destination tape drives, job schedules, and the like from the primary coordinator. The primary coordinator also indicates whether to perform a checkpoint restart or a fresh restart after a failover. Arrangement of the backup service in this manner improves efficiency by avoiding repetitive backups.

The primary coordinator controls all backup operations in the cluster. The user submits backup jobs for the applications through the primary coordinator. The primary coordinator is cluster-aware. In other words, the primary coordinator is a virtual server that can be failed over to any node in the cluster. Thus, the primary coordinator behaves like a cluster application and is highly available. Servers on the LAN that are not part of the cluster can also submit backup jobs to the cluster-attached tape library though the primary coordinator service. The main functions of the primary coordinator are: to maintain the backup operations database; to arbitrate the usage of shared tape drives by the cluster nodes; to communicate with the cluster service (the application that governs the operation of the cluster); to obtain updates on failover details when a cluster failover is triggered; and, after a failover has occurred, to instruct the backup service on the new node to perform a fresh job restart or a checkpoint restart.

The backup operations database contains the job details information such as the source, destination, schedule, users, etc., that is submitted by users. In addition, backup job update information, such as logs, backup checkpoints, etc., can also be stored in the backup operations database. Finally, the backup operations database is preferably stored on a shared disk so that after a failover event, the backup operations database can be accessed from a new node.

The primary coordinator also arbitrates the usage of the shared tape drives that are used by the cluster nodes. The primary coordinator assigns the tape drives that the backup servers use for each node. In the event of a cluster node failover, the primary coordinator interfaces with the cluster service in order to obtain the details of the failover, such as the applications/disks versus node mapping. After the failover event, the primary coordinator informs the backup service of the new node to perform a fresh job restart, or a checkpoint restart. Checkpointing is the process of periodically storing the state of the backup process onto a disk or other persistent media. Whenever a failure happens during the backup process, the backup can be restarted from the last stored state instead of restarting from scratch. The process of restarting with checkpoint data is called a checkpoint restart. In this case, the primary coordinator reassigns and reorganizes the backup jobs based on the conditions of the node failures.

Figure 2:
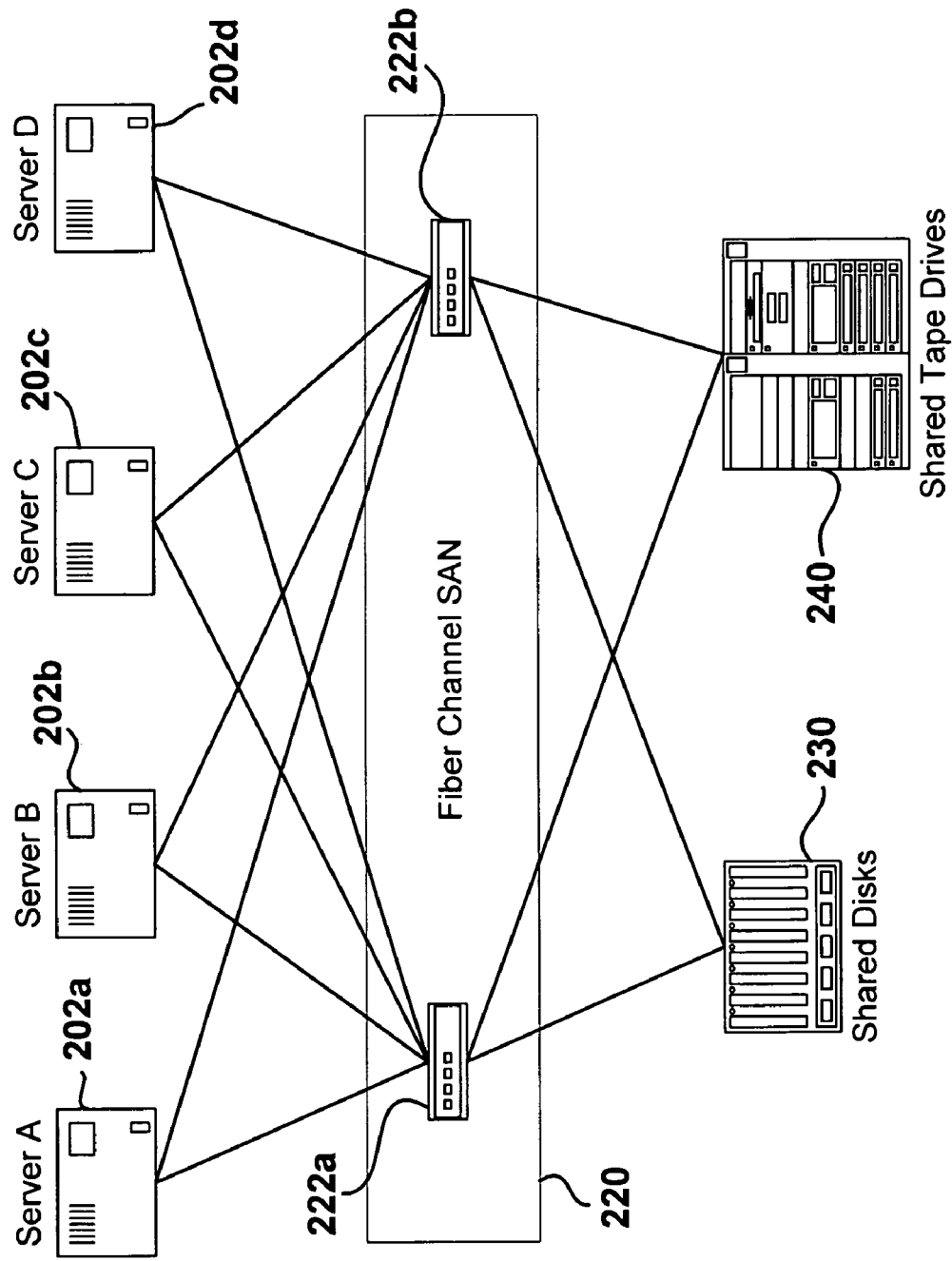
FIG. 2 is a block diagram illustrating the cluster system of an embodiment of the present disclosure with three active nodes and one passive node.

FIG. 2 illustrates a cluster, according to the teachings of the present disclosure. The system 200 of this illustrative example has four cluster nodes 202a, 202b, 202c, and 202d. Each of the nodes 202a–202d is connected to, for example, one or more FC SANs 220, as illustrated in FIG. 2. The SAN 220 can contain, for example one or more switches 222 (illustrated as 222a and 222b in FIG. 2). The SAN 220 is operatively connected to, for example, one or more shared disks 230 and/or one or more shared tape drives 240. It will be understood by those in the art that other devices which are developed from time to time may also be connected to the cluster system of the system 200 without departing from the spirit and scope of the present disclosure. Moreover, more or fewer cluster nodes, SANs, and mass storage devices (disks, tapes, and the like) can be present in the system 200.

Figure 3:
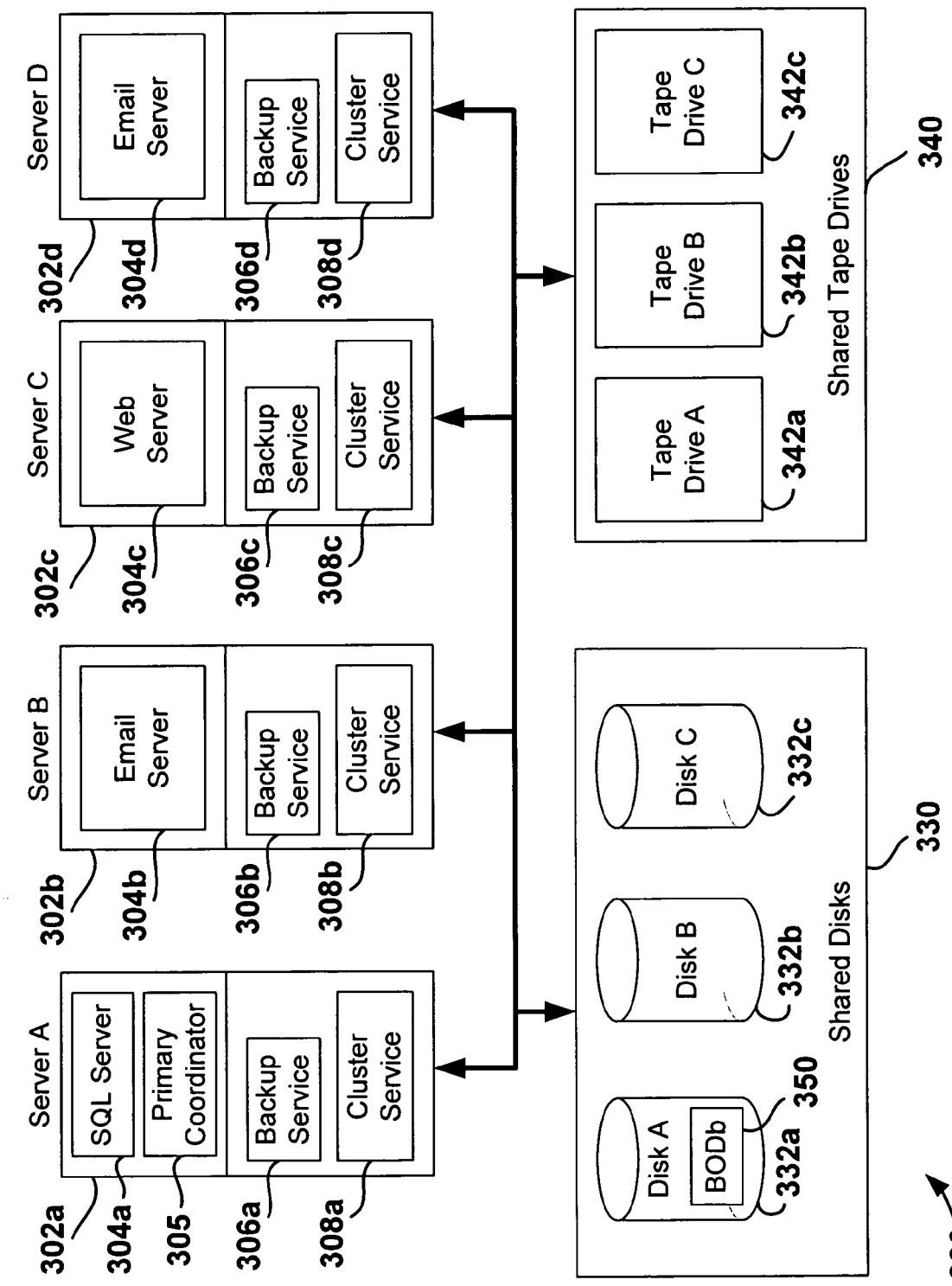
FIG. 3 is a block diagram illustrating the constituent components of the present disclosure according to the block diagram of FIG. 2.

FIG. 3 is a block diagram illustrating the various processes that are components of the system of the present disclosure that are executed on the system 200 illustrated in FIG. 2. As illustrated in FIG. 3, four cluster nodes 302a, 302b, 302c, and 302d each have a respective backup service 306a–306d, and a cluster service 308a–308d. Typically, each server node is executing one or more applications, such as SQL (database) server 304a, email servers 304b and 304d, and web server 304c. One of the nodes 302 is tasked with executing the primary coordinator 305. The primary coordinator 305 is constructed and arranged to communicate with the backup service 306 and the cluster service 308 of its own node as well as those of the other nodes 302, as illustrated in FIG. 3. Each node 302 in the cluster 300 can have its own backup service 306 (designated as 306a through 306d in FIG. 3). In case of a failure of the node hosting the primary coordinator, any other node may be pressed into service to operate the primary coordinator 305 on the cluster system 300. The system 300 also includes a backup operations database 350 that is operative with the primary coordinator 305. The primary coordinator 305 is also operative with the shared disks 330 and/or the shared tape drives 340, which may be used to host the backup operations database as illustrated in FIG. 3. As with the shared disks 330, the shared tape drives 340 can contain one or more tape drives such as drives 342a, 342b, and 342c as illustrated in FIG. 3. Use of the mass storage facilities of the cluster 300 may sometimes be necessary to preserve status information for the primary coordinator in the event of a failure of the node hosting the primary coordinator 305. For example, shared disks 330 includes one or more disks 332 as illustrated in FIG. 3. Storing status and other key information for the primary controller 305 in, for example, the backup operations database 350 on disk 332a, can decrease disruption or downtime of the primary coordinator in the event that the node hosting the primary coordinator 305 fails.

Figure 4:
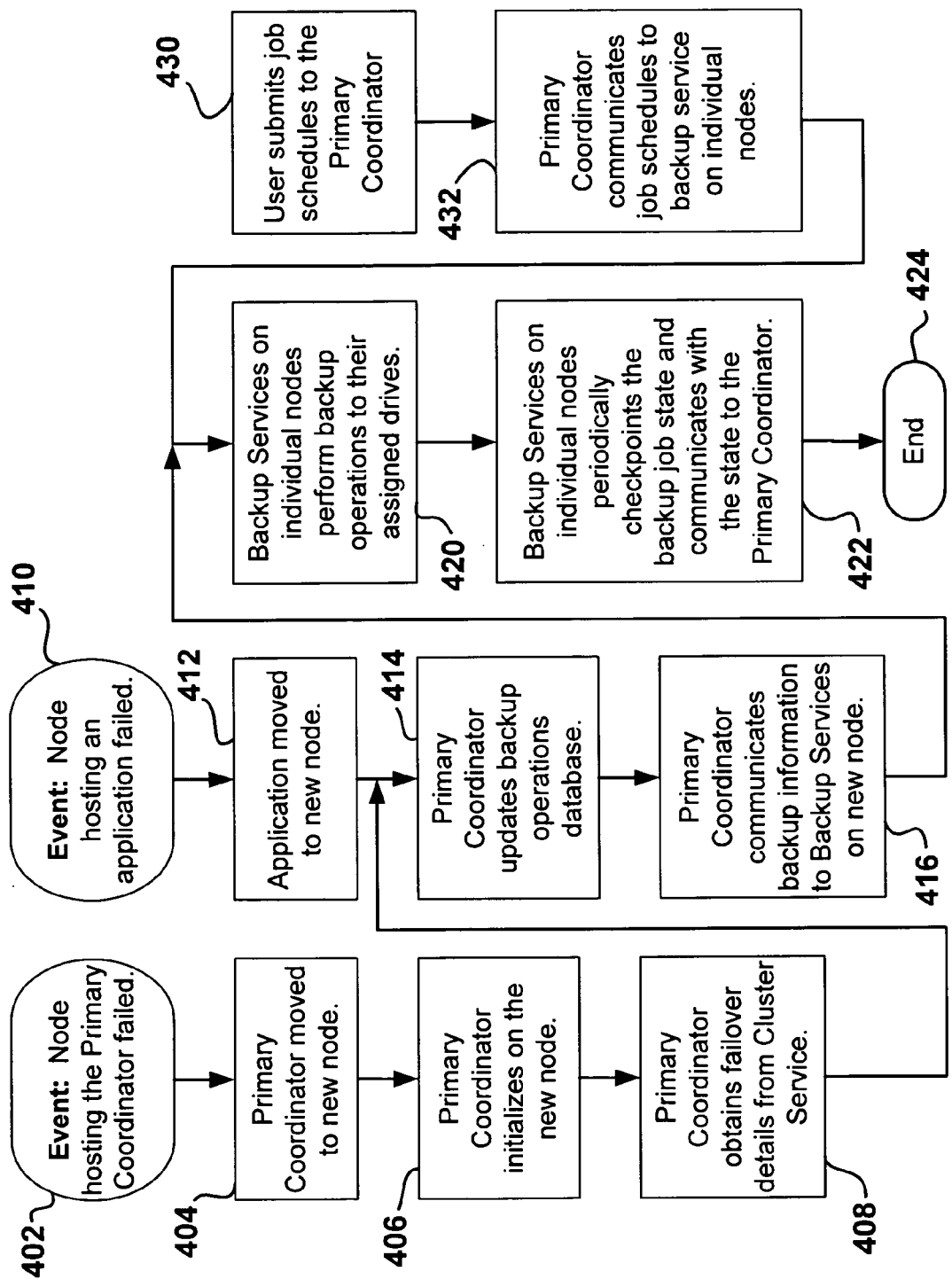
FIG. 4 shows a flow diagram for one embodiment of a method for backing up storage resources in a clustered computing environment in accordance with the teachings of the present disclosure.

The operation of the present disclosure is illustrated in FIG. 4. The flowchart illustrated in FIG. 4 has three potential entry points via events 412 and 414 and by user actions in step 430. Event 402 occurs when the node 302 that is hosting the primary coordinator 305 fails. Such a failure can be detected in the normal fashion. In this scenario, because the node hosting the primary coordinator has failed, the primary coordinator 305 must be moved to a new node 302, and thus step 404 is executed. After being moved, the primary coordinator 305 is initialized on the new node 302 in step 406. In step 408, the primary coordinator 305 obtains the failover details from the cluster service 308. Information obtained from the cluster service 308 includes, for example, an indication that an application 304 has moved along with the primary coordinator.

Another entry point into the method illustrated in FIG. 4 occurs when a node hosing an application 304 fails (step 410). If the node 302 hosting the application 304 fails, the application 304 has to be moved to a new node 302 in step 412. After step 412 and/or step 408 have been accomplished, the primary coordinator updates the backup operations database 350 in step 414. The primary coordinator then, in step 416, communicates the backup information to the backup services 306 on the new node 302 that is hosting the moved application 304 and/or the primary coordinator 305, if the latter has moved. The communication may also specify if a backup job that was running previously requires a fresh restart, or a checkpoint restart. In step 420, the backup service 306 on the individual nodes 302 perform backup operations to their assigned one or more disks 330. Each backup service 306 may perform the backup through the SAN 220 to its assigned one or more tape drives 340. In addition, the backup services 306 on the individual nodes 302 periodically checkpoints the backup job state and communicates that state to the primary coordinator 305 as illustrated in step 422. An alternative entry point is at step 430, wherein the user submits job schedules to the primary coordinator 305, afterwhich execution moves to step 432, wherein the primary coordinator communicates job schedules to the backup services 306 on the individual nodes 302 and execution is moved to step 420 as illustrated in FIG. 4.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for backing up a cluster having one or more nodes, comprising:
   providing a primary coordinator executing on a first node of the cluster;
   providing a backup service for each of the nodes, each backup service operative with the primary coordinator;
   detecting the failure of a node hosting the primary coordinator;
   moving the primary coordinator to a second node of the cluster;
   initializing the primary coordinator on the second node;
   obtaining failover information by the primary coordinator from a cluster service of the second node.

2. The method of claim 1, further comprising: updating a backup operations database by the primary coordinator.

3. The method of claim 2, further comprising: communicating backup information to the backup service for the second node by the primary coordinator.

4. The method of claim 3, further comprising: performing backup operations by the backup services.

5. The method of claim 4, wherein the backup operation is performed to a pre-assigned drive.

6. The method of claim 5, wherein the backup operation is through a SAN.

7. The method of claim 4, further comprising: checkpointing a backup job state.

8. The method of claim 7, further comprising: communicating the state with the primary coordinator.

9. The method of claim 8, further comprising: communicating one or more job schedules to one or more of the backup services.

10. The method of claim 7, wherein checkpointing occurs periodically.

11. A system comprising:
    a cluster having two or more nodes, each of the nodes constructed and arranged to execute at least one application, each of said nodes further executing a backup service;
    a primary coordinator executing on one of the two or more nodes, the primary coordinator constructed and arranged to coordinate the backup of data on the nodes by communicating backup information to the backup services.

12. The system of claim 11, wherein the system is constructed and arranged to move the primary coordinator to a new node of the two or more nodes in the event that the node hosting the primary coordinator fails.

13. The system of claim 12, wherein the primary coordinator is constructed and arranged to update a backup operations database to reflect the failure of the node hosting the primary coordinator.

14. The system of claim 13, wherein the update contains information from a client service that is executing on one of the two or more nodes.

15. The system of claim 14, wherein the primary coordinator communicates backup information to a backup service executing on the new node.

16. The system of claim 15, wherein the backup information includes information about a backup job that was running previously so that a restart may be initiated.

17. The system of claim 16, wherein the restart is a checkpoint restart.

18. The system of claim 16, wherein the restart is a fresh restart.

19. The system of claim 11, wherein the system is constructed and arranged to move an application to a new node of the two or more nodes in the event that the node hosing the application fails.

20. The system of claim 19, wherein the primary coordinator receives one or more failover details from the a client service.

21. The system of claim 19, wherein the system is constructed and arranged for the backup services on the two or more nodes to perform one or more backup operations to one or more assigned tape drives.

22. The system of claim 21, wherein the backup services are accomplished through a SAN.

23. The system of claim 21, wherein the backup service periodically checkpoints a backup job state.

24. The system of claim 23, wherein the backup service communicates the backup job state to the primary coordinator.

25. A cluster having one or more nodes, each of the nodes being a computer having one or more microprocessors, and having memory operative with the one or more microprocessors, the cluster further having at least one SAN that is operative with each of the nodes, the cluster comprising:
    a backup service on each of the nodes; and
    a primary coordinator executing on one of the nodes, the primary coordinator constructed and arranged to direct the backup service on each of said nodes to backup data on the node through the SAN.

* * * * *